(12) United States Patent
Samuelsen

(10) Patent No.: US 8,935,889 B2
(45) Date of Patent: Jan. 20, 2015

(54) WIND POWER PLANT WITH MODULAR TOWER SYSTEM

(75) Inventor: Olaf Samuelsen, Jerrisbek (DE)

(73) Assignee: Senvion SE, Hamburg (DE)

( * ) Notice: Subject to any disclaimer, the term of this patent is extended or adjusted under 35 U.S.C. 154(b) by 0 days.

(21) Appl. No.: 13/641,341

(22) PCT Filed: Apr. 14, 2011

(86) PCT No.: PCT/EP2011/055969
§ 371 (c)(1),
(2), (4) Date: Oct. 15, 2012

(87) PCT Pub. No.: WO2011/141270
PCT Pub. Date: Nov. 17, 2011

(65) Prior Publication Data
US 2013/0034450 A1 Feb. 7, 2013

(30) Foreign Application Priority Data
Apr. 15, 2010 (DE) .......................... 10 2010 015 075

(51) Int. Cl.
| | |
|---|---|
| *E04H 12/00* | (2006.01) |
| *F03D 11/04* | (2006.01) |
| *E04H 12/28* | (2006.01) |
| *F03D 11/00* | (2006.01) |

(52) U.S. Cl.
CPC ............... *F03D 11/04* (2013.01); *E04H 12/28* (2013.01); *F03D 11/00* (2013.01); *F05B 2230/60* (2013.01); *F05B 2240/40* (2013.01); *Y02E 10/728* (2013.01)
USPC ......... 52/40; 52/651.02; 52/655.1; 52/745.04

(58) Field of Classification Search
USPC ............... 52/651.01, 651.02, 745.03, 745.04, 52/831, 79.4, 236.2, 745.01, 655.1, 52/655.01, 745.18, 40; 290/55; 182/93, 94
See application file for complete search history.

(56) References Cited

U.S. PATENT DOCUMENTS

2009/0031668 A1    2/2009    Llorente Gonzalez

FOREIGN PATENT DOCUMENTS

| | | |
|---|---|---|
| CA | 2 514 991 | 8/2004 |
| DE | 103 05 689 | 9/2004 |
| EP | 2 093 417 | 8/2009 |
| WO | WO-00/36724 | 6/2000 |
| WO | WO-02/38953 | 5/2002 |
| WO | WO-2004/031578 | 4/2004 |
| WO | WO-2008/000565 | 1/2008 |

OTHER PUBLICATIONS

International Search Report and Written Opinion mailed Jan. 20, 2012, directed to International Application No. PCT/EP2011/055969; 18 pages.

*Primary Examiner* — Jeanette E Chapman
*Assistant Examiner* — Daniel Kenny
(74) *Attorney, Agent, or Firm* — Morrison & Foerster LLP

(57) ABSTRACT

A wind power plant tower having a multiplicity of tower segments which are arranged one on top of the other and enclose an interior tower space, and at least two system components from the group of a conductor, a lighting and a climbing device for operating personnel arranged in the tower inner space. Segments for the system components are structurally combined with a beam to form a separate supply module spanning a number of tower segments. The laborious assembly of the system components can thus be carried out at ground level, and only the supply module thus completed, which spans a number of segments, is then mounted in the tower. This obviates the need for a considerable amount of work in the form of hazardous working in the tower.

24 Claims, 4 Drawing Sheets

Fig. 3
a)
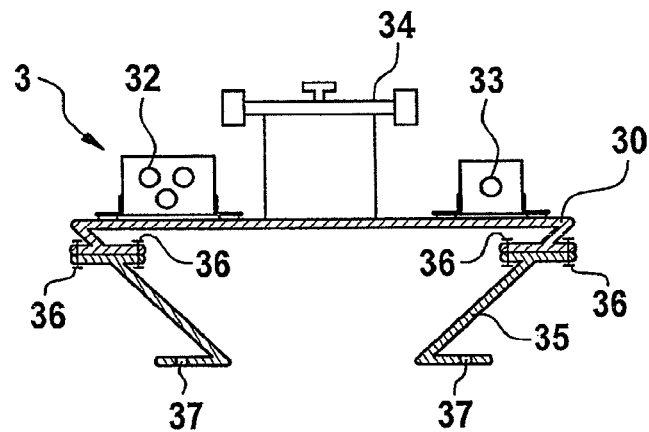
b)
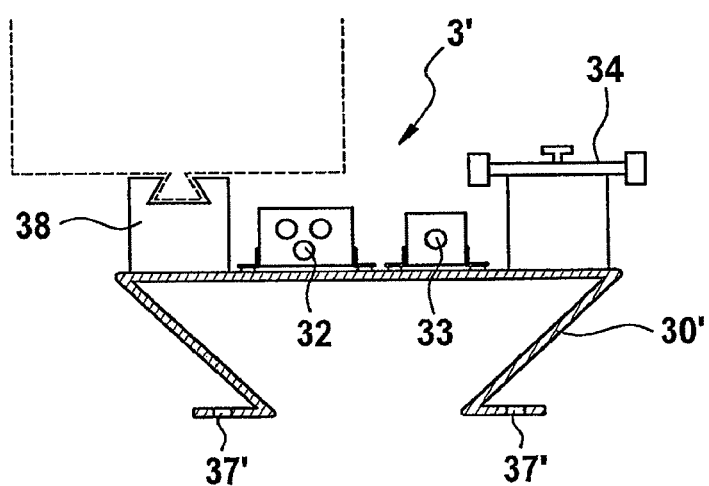
c)
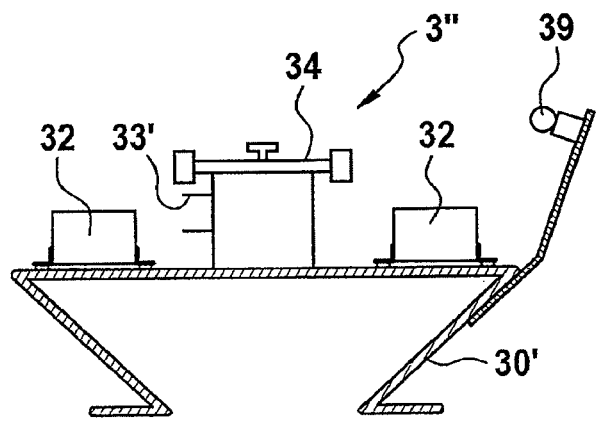

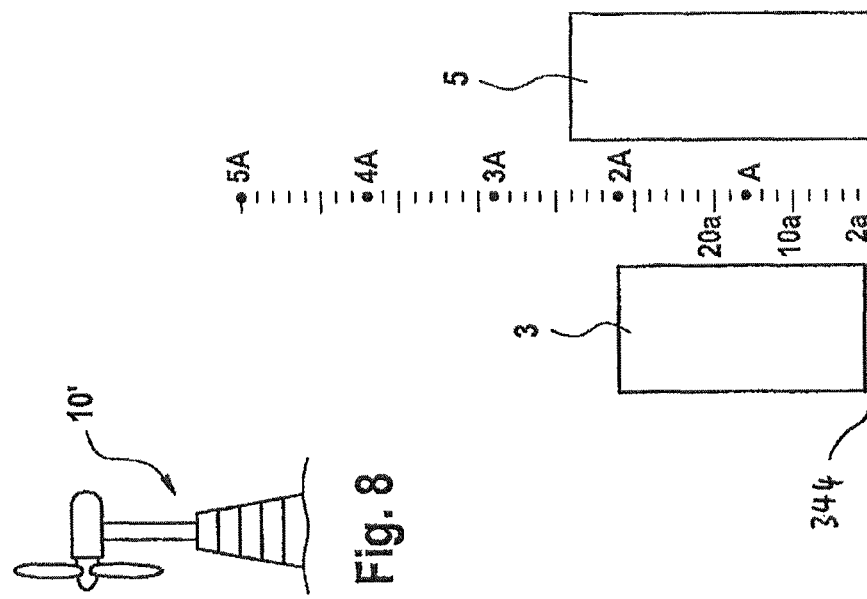
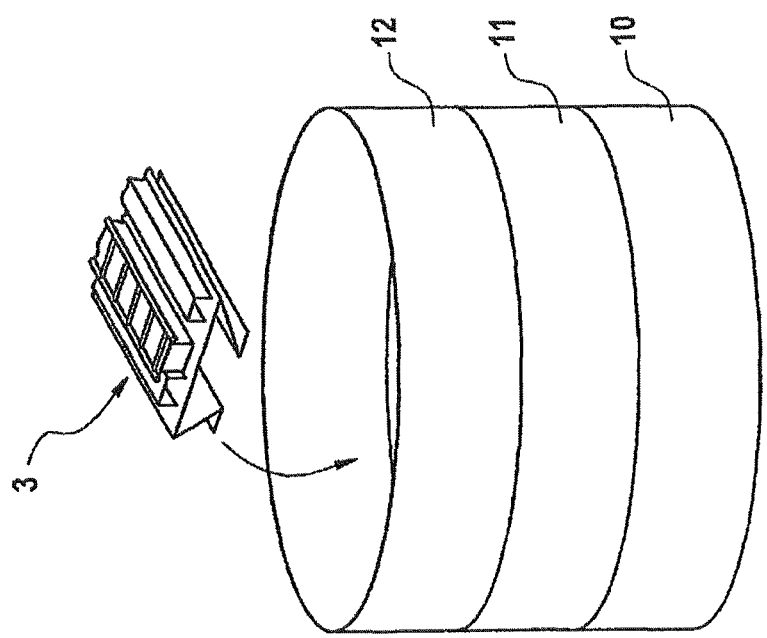

WIND POWER PLANT WITH MODULAR TOWER SYSTEM

REFERENCE TO RELATED APPLICATIONS

This application is a national stage application under 35 USC 371 of International Application No. PCT/EP2011/055969, filed Apr. 14, 2011, which claims the priority of German Application No. 10 2010 015 075.4, filed Apr. 15, 2010, the entire contents of which are incorporated herein by reference.

FIELD OF THE INVENTION

The invention relates to a tower for wind power plants, which is composed of a multiplicity of tower segments, arranged one above the other and surrounding a tower inner space, and of system components arranged therein, such as power conduction means, signal conduction means and climbing devices for operating personnel. The invention extends, further, to a corresponding method for setting up such a tower.

BACKGROUND OF THE INVENTION

High towers are required for the construction of wind power plants of high output. The reasons for this are that, with an increasing output of the wind power plants, ever larger rotors become necessary, and also that the wind force increases with a greater height. The towers must therefore not only reach a greater height, but also be designed for receiving wind power plants of ever higher performance. Since the towers are, as a whole, much too large to be transported, they are first constructed locally on the building site. Concrete towers have proved especially appropriate for this purpose, which are set up from a plurality of sleeve-like tower segments arranged one above the other, the tower segments being produced completely or partially from semifinished elements on the building site. While even high towers can thereby be manufactured efficiently in remote areas, there is also the problem of producing and mounting the tower fittings. The tower fittings include the components which serve for transmitting the electrical power generated by the wind power plant from the gondola into the tower foot, such as, for example, conduction means for power transmission or for controlling the operation of the wind power plant and also climbing devices for the operating personnel so that they can climb up in the tower. Installing these tower fittings in the set-up tower is complicated and, since the work sometimes also has to be carried out at greater heights, hazardous.

For the sake of simplification, it is known, for example in the case of steel tube towers, to preassemble individual cylinder-like tower segments at least partially at the works or on the building site, with conductor rails or power cables on the tower inside. The advantage of this is that conductor rails or power cables having heavy-duty dimensioning precisely because of the high power to be transmitted no longer need to be mounted in the already set-up tower on the building site, but instead are located from the outset in the tower segment. One disadvantage of this is that this is practicable only for tower segments up to a certain size (a diameter of just 4 m), since, in the case of larger tower segments, road transport can hardly be carried out.

SUMMARY OF THE INVENTION

The object on which the invention is based is to avoid said disadvantages and to provide a more universal possibility for mounting the tower fittings, which is practicable both in the case of tubular towers and in the case of concrete towers produced from prefabricated concrete segments or in the case of hybrid towers (concrete at the bottom, tube at the top) or those made from non-prefabricated concrete segments.

The solution according to the invention lies in the features as broadly described herein. Advantageous developments are the subject matter of the detailed embodiments described below.

In a wind power plant tower composed of a multiplicity of tower segments, arranged one above the other and surrounding a tower inner space, and of system components arranged therein, comprising conduction means, lighting means and/or a climbing device for operating personnel, there is provision, according to the invention, whereby segments for at least two of those system components are combined structurally by means of a girder to form a separate supply module spanning a plurality of tower segments.

The essence of the invention is the idea of preassembling segmentally, as an independent supply module, the individual system components, such as, for example, conduction means, lighting means and the climbing device, the conduction means being capable of comprising, in particular, power output means and/or signal conduction means. All the complicated mounting steps for fastening and contacting or for insulated arrangement on the supply module can in this case be carried out at ground level. When the supply module is completed, it can be lifted as a whole and be inserted into the inner space of the tower composed of a multiplicity of tower segments. All that is then left is to fasten the supply module to the tower inner wall at a few locations. Since, according to the invention, the supply module spans a plurality of tower segments and only the fastening work or connection to the adjacent supply module is required, rapid installation becomes possible. Basically, the more devices are arranged on the supply module, the greater is the saving in terms of outlay achieved by means of the invention. It will be appreciated, however, that not necessarily everything needs to be arranged in the supply module; for example, signal conduction means may also be arranged so as to be suspended freely in the tower or only holders for the actual signal conduction means are arranged, into which said signal conduction means are placed.

In this case, preferably, special holder adapters allowing rapid mounting in the tower inner space are provided for the supply module. Preferably, at least one fixed bearing holder adapter and one loose bearing holder adapter are provided for each supply module. Not only is a minimum of additionally required mounting work thereby achieved, but, by means of the loose bearing, fine positioning can easily be carried out in order to achieve a seamless connection to adjacent supply modules. It has proved appropriate to arrange the fixed bearing holder adapter in each case in the upper region of the supply module.

It is expedient, further, if the holder adapters are designed differently, depending on the clear width of the tower inner space. Thus, the holder adapters for the tower segments with a large clear width (diameter), that is to say which are used in the lower region in a conventional conical tower, can provide a higher horizontal clearance of the supply module from the tower inner wall than in tower segments with a smaller clear width which are located further up. What can be achieved thereby is that identical supply modules can be used over the entire height of the tower, only the holder adapters being different so as to adapt to the different shape and size of the respective tower segments. Both the holder adapters and the girder may be produced, for example, from edged sheet metal and/or tube material (round or square).

The supply modules are expediently dimensioned such that they have a length which is substantially greater than the height of a tower segment. Substantially greater is understood in this context to mean that the supply modules preferably span at least three tower segments, but are preferably no longer than the height of ten tower segments for the sake of easy handling. Conventional heights of a tower segment made from concrete are about 3 to 4.5 m.

The supply modules are expediently provided at their ends with in-line connection couplings. The possibility of lining up the supply modules can consequently be achieved, while, by suitable design of the in-line connection couplings, for example as a plug system, both mechanical and electrical coupling can be achieved simply by pushing together. In-line connection connectors are understood to mean those electrical elements which, when connecting mechanically, also make electrical contact, and, where appropriate, only additional securing or tensioning devices have to be mounted. Critical mounting activity inside the tower is consequently further simplified.

During the preassembly of the supply modules on the ground, the individual system components are arranged on a girder. The supply module is inserted together with this girder into the tower. The girder may be composed of a continuous element or of a plurality of subsegments. The individual subsegments may be connected directly to one another or, for example, be provided only at the start and end of the supply module. In a further expedient embodiment, the girder may be integrated as one of the system components, in particular the climbing device. Thus, for example, the ladder can be designed to be so stable that it functions as a girder. However, it is not absolutely necessary that the girder remains in the tower after mounting. In an expedient embodiment, there may be provision whereby the girder is designed as an auxiliary girder which can be removed after the supply module has been mounted in the tower inner space. The auxiliary girder can consequently be used for preassembling further supply modules, thus further reducing the overall outlay.

The climbing device may comprise a ride-on installation (elevator), climbing aid and/or ladder. For the connection between adjacent supply modules, preferably short coupling pieces are provided which in the case of a ladder comprise, for example, two to three rungs. However, even full modularization may be provided. If in this case a ladder provided for the climbing device has a rung spacing a, the length of the supply modules preferably amounts to an integral multiple of the rung spacing a. Preferably, further, for the supply modules a length module system is provided, by means of which different lengths with a minimum of different supply modules can be produced, while at the same time the rung spacing is preserved. The basis for this is a length module A which corresponds to an integral multiple of the rung module (spacing of the rungs) a. Advantageously, the length of a first supply module is then equal to an odd-numbered multiple of the module A, the length of a second supply module is equal to an even-numbered multiple of the module A, and finally the length of a third supply module corresponds to the length of the second supply module, minus a rung module a. Thus, for example, the first supply module may have the length once A, the second supply module the length twice A and the third supply module the length twice A minus a. Further, even fourth supply modules may be provided which have greater lengths which are multiples of the module A, so that even long distances can thus be bridged efficiently. By means of such a length module system, a multiplicity of different lengths can be covered by a minimum number of different supply modules, while at the same time the interaction of module/rung module ensures that the rung spacing remains the same even at connection points of adjacent supply modules.

In a preferred version, the supply module according to the invention could be used in the lower part of a hybrid tower which is composed, for example, in the upper part of a steel tube tower and in the lower part of a concrete tower. The system components in the steel tube tower could be preassembled either at the works or on the building site before the tower is set up or else could be installed in this by means of the supply module according to the invention after the complete steel tube tower or individual steel tube segments have been set up. The supply modules could be installed in the concrete part of the hybrid tower as soon as a corresponding number of concrete segments are placed one onto the other and these are sufficiently stabilized. It would also be possible, however, to construct the concrete tower to an extent such that a plurality of supply modules can be installed in succession. In a preferred procedure for setting up a hybrid tower, first the concrete tower would be equipped with the supply module according to the invention before the steel tube tower, together with the preassembled system components, is set up on the concrete tower.

If tensioning elements for the vertical and/or horizontal bracing of the individual concrete segments are provided in the concrete tower, the supply modules would preferably be installed on the tower wall in a region, the immediate vicinity of which is not penetrated by tensioning elements.

The invention relates, further, to a corresponding method for setting up a wind power plant tower. The above description is referred to for explanation purposes.

BRIEF DESCRIPTION OF THE DRAWINGS

The invention is explained in more detail below, with reference to the accompanying drawing which illustrates advantageous exemplary embodiments and in which:

FIG. 3 shows a cross-sectional view of the supply module according to FIG. 2;

FIG. 4 shows a view of the mounting of the supply module in a plurality of tower segments arranged one above the other;

FIG. 7 shows examples of a supply module system with different lengths; and

FIG. 8 shows an alternative version of the tower as a hybrid tower.

DETAILED DESCRIPTION OF THE INVENTION

Figure 2:
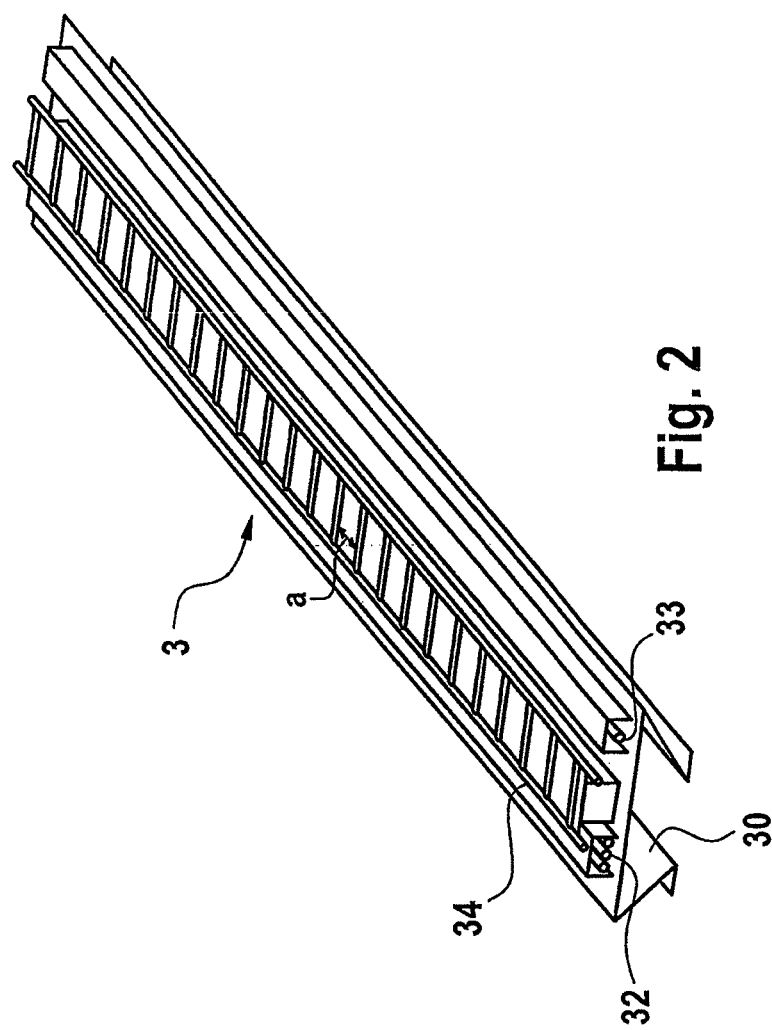
FIG. 2 shows a perspective part view of a supply module.

A wind power plant according to an exemplary embodiment of the invention comprises a tower 1 with a gondola 2 arranged on the latter pivotably in the azimuth direction. Arranged rotatably on the end face of said gondola is a wind rotor 27 which via a rotor shaft 28 drives a generator 21 arranged in the gondola 2, in order thereby to generate electrical power. The electrical power is routed, via power cables running in the tower and functioning as power conduction means 22, to a machine transformer 29 which is arranged at the tower foot and which adapts the voltage to a voltage necessary for transmission in a network (it may be noted that the location of the machine transformer is unimportant per se; it may just as easily be arranged at the top in the gondola 2 or at an intermediate level). Further, the gondola has arranged in it an operating control 20. The latter is connected via signal conduction means 23, likewise running in the tower, to the tower foot where connections for further signal sources and signal receivers are provided. Finally, a ladder 24 is arranged in the tower on the tower inner wall and functions as a climbing device for operating personnel who climb up in the gondola 2 for maintenance purposes.

The tower 1 is constructed in a multipart manner from a multiplicity of sleeve-like tower segments 10, 11, 12, 13, 14 arranged one above the other. The individual segments may be prefabricated rings made, for example, from concrete material or concrete rings which are assembled from semi-finished parts on the building site or are cast completely. To assemble the tower 1, first the lowermost ring 10, which has, for example, attachments for the transformer 29 or devices for climbing inside the tower, is placed onto the prepared foundation, and the further tower segments 11, 12, 13, 14 are placed thereon in the correct sequence.

Figure 1:
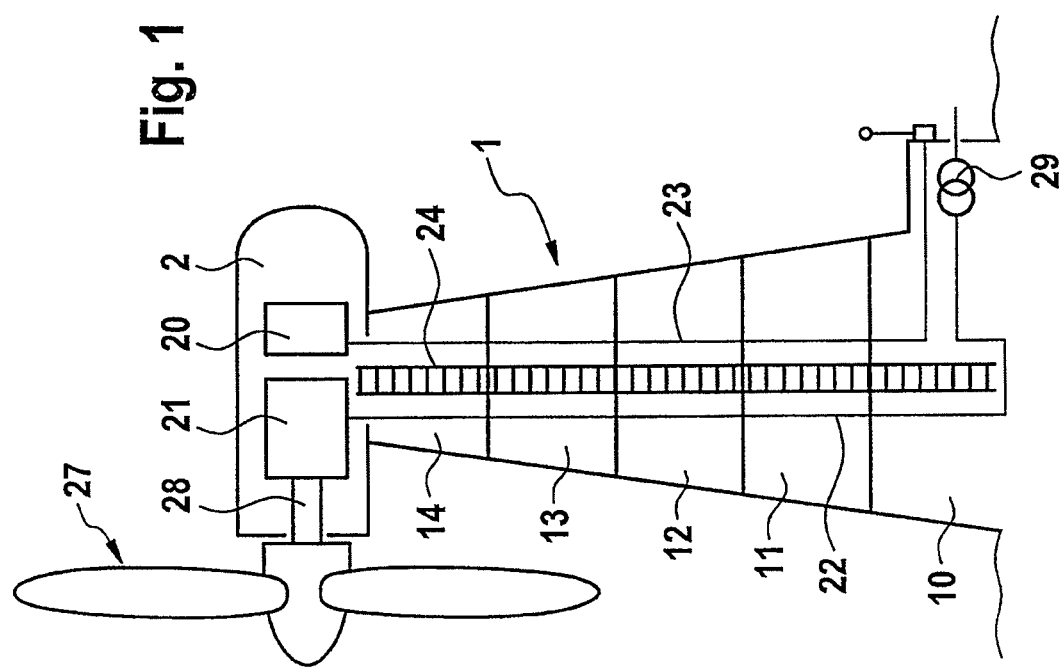
FIG. 1 shows a diagrammatic view of a wind power plant with a tower according to an exemplary embodiment of the invention.

The arrangement, illustrated diagrammatically in FIG. 1, of the power conduction means 22, signal conduction means 23 and ladder 24 is illustrated in more detail in FIG. 2. All the abovementioned components are combined into a supply module 3. The latter comprises a girder 30 which extends over a length of the plurality of tower segments; three tower segments may be assumed in the exemplary embodiment illustrated. The girder 30 may be composed of a continuous element or of individual subsegments. The individual subsegments may be connected directly to one another or, for example, be provided only at the start and end of the supply module 3. In a further embodiment, there may be provision, for example, for designing the ladder to be so stable that it is used at least partially as a girder. The ladder 34 (corresponding to 24 in FIG. 1), the signal conduction means 33 (corresponding to 23 in FIG. 1), in a holding device provided for the purpose, and finally the power conduction means 32 (corresponding to 22 in FIG. 1), in a further holding device designed especially for the purpose, are arranged parallel to the longitudinal axis of the supply module 3. The supply module 3 is preassembled and is introduced as a whole, held at its girder 30, into the tower inner space which is formed by already mounted tower segments 10, 11, 12 (see FIG. 5). The supply module 3 then needs only to be connected via fastenings at its upper and lower end to the tower inner wall. In the case of long supply modules, additional fastening points may be provided. The complicated individual mounting of the conduction means for electrical power or signals and the ladder is no longer necessary by virtue of the invention.

Holder adapters 35 may be provided for fastening the supply module 3. They are premounted onto the girder 30 of the supply module 3 via screwing 36 (or clamping). The holder adapters 35 are provided in turn, at their other end, with a fastening device for arrangement on the tower inner wall, said fastening device preferably being designed as a screw connection with through holes (or clamping) on the holder adapter 35. For this purpose, the through holes are designed only at one end as long holes 37', so that a loose bearing is formed, while the opposite end without long holes forms a fixed bearing. The holder adapters 35 may have different dimensions, depending on the tower segment 10, 11, 12, 13, 14 in which the supply module is to be arranged. Thus, with regard to the example in FIG. 4, the holder adapters 35 for mounting the supply module in the region of the lower tower segments 10, 11 are larger and give the girder 30 greater clearance from the tower inner wall than the holder adapters 35 which fasten the supply module in the region of the upper tower segment 12. A preferably vertical arrangement of the supply modules 3 can consequently be achieved in a simple way even in the case of the conventional conical tower shapes.

FIGS. 3a, b, c illustrate three different embodiments of supply modules 3, 3', 3". The embodiment in FIG. 3a corresponds to that illustrated in FIG. 2, with an essentially planar carrier plate, and on the underside of which the holder adapter 35 is arranged and on the top side of which the ladder 34, the power conduction means 32 and the signal conduction means 33 are arranged over the length of the supply module 3. FIG. 3b illustrates an alternative embodiment in which the supply module is designed for receiving a mechanical climbing device for the operating personnel. This is a ride-on cage in the manner of an elevator, a guide rail 38 for the ride-on cage (illustrated by dashes) being provided on the carrier plate 30' instead of or in addition to the ladder 34. The guide rail does not need to carry the weight of the ride-on cage, but merely keeps it in track, so that it needs to absorb only relatively low forces. It may nevertheless be recommended, precisely in the case of this design, to design the holder adapter so as to be integral with the carrier plate 30', thus giving rise to a one-piece structure. A further alternative embodiment is illustrated in FIG. 3c. The ladder 34 is arranged centrally and power conduction means 32 are arranged on both sides of the latter on the carrier plate 30' having an integral holder adapter. A retention 33' for signal conduction means 33 is fastened laterally to the girder of the ladder 34. Further, a segment for a strip light 39 is arranged on an extension piece of the carrier plate 30'.

It may also be noted that a carrier plate 30' is not necessarily required for the supply module. It may also be designed as an auxiliary girder which serves for mounting the supply module and, after the connection of the supply module 3 via the holder adapters 35, can be removed from the tower inner wall. This has the advantage that the auxiliary girder is reusable for further supply modules.

Figure 5:
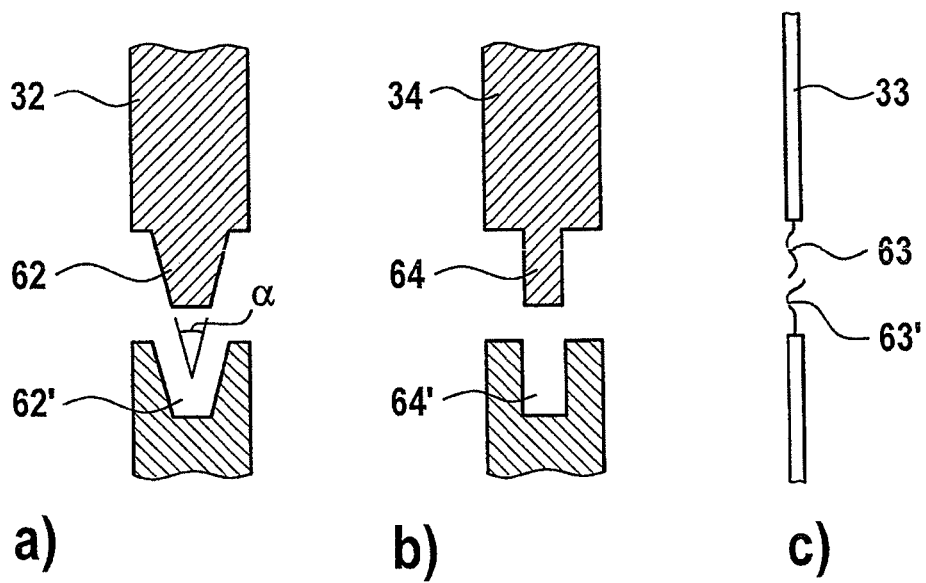
FIG. 5 shows embodiments of in-line connection couplings for the supply modules.

For the simple connection of supply modules 3 adjacent to one another, suitable in-line connection devices are provided for the individual components. These devices are illustrated in more detail in FIG. 5. To couple the power conduction means 32 to one another easily, a conical projection 62 and a conical orifice 62' are provided in each case at their ends. The depth of the orifice 62' is in this case at least as great as the projecting amount of the projection 62 plus a play of about 1 to 3 mm. When the end of one power conduction means 32 is being introduced into the other end of the adjacent power conduction means 32, the cone angle α ensures automatic centering until bearing contact over the entire area along the cone surface area is finally achieved. Good contact is thus ensured, so that it becomes possible to have a low-resistance line even in the case of high currents. Separate contactings by means of cables to be screwed together are therefore unnecessary. The outlay in mounting terms is thereby further reduced. FIG. 5b illustrates for the ladder 34 an in-line connection means which is likewise based on the principle of a projection and of an orifice of identical form, but here in each case with a cylindrical shape. Since centering is already achieved by means of the cone of the power conduction means, second centering by the in-line connection elements of the ladder 34 would have no benefit. Instead, the selected orifice 64' is somewhat larger than the width of the projection 64, so that a certain play is available as tolerance compensation. Reliable fitting of the ladder spars one in the other is nevertheless achieved. Another type of in-line connection element is expediently provided for the signal conduction means 33. Provided here at the respective ends are complementarily shaped spring tongues 63, 63' which, when the adjacent supply modules 3 are led up to one another, automatically come into contact with one another and are connected to one another nonpositively and, preferably, positively. The outlay in mounting terms is therefore further reduced.

Figure 6:
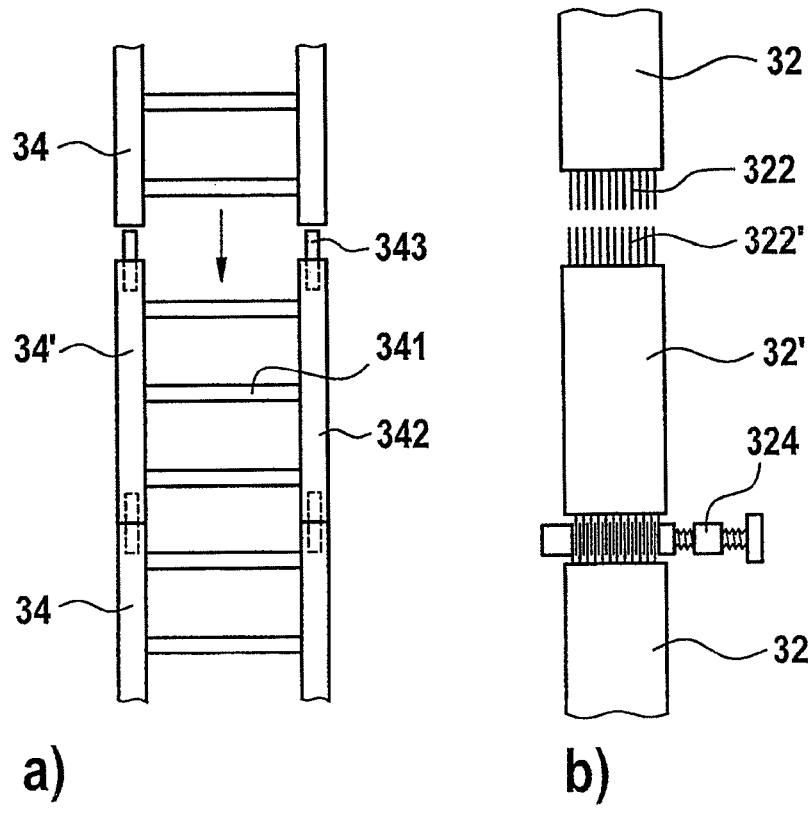
FIG. 6 shows connection pieces for conduction means and a climbing device.

An alternative connection of adjacent supply modules 3 is illustrated in FIG. 6. According to this, short connection pieces 34' are provided for the ladder 34. They correspond in design to the ladder 34, but comprise only a few (three in the exemplary embodiment illustrated) rungs 341. Inserted on the end faces of their side spars 342 are connecting bolts 343 which engage into corresponding end-face receptacles on the respectively adjacent ladder 34 and consequently connect positively. The connection pieces 34' can consequently be mounted in their exact position simply by being plugged in. FIG. 6a illustrates at the top a state during mounting (in the direction of the arrow) and at the bottom the mounted state. The connection pieces 34' are preferably premounted removably on the supply modules 3, so that they no longer need to be delivered as separate parts for mounting purposes. Electrical intermediate connectors 32' may be provided for the conduction means, in particular the power means 32. Said intermediate connectors comprise at each of their ends a group of parallel-aligned contact plates 322' made from thin conductive material which are pushed in a comb-like manner into a group of correspondingly designed counter contact plates 322 at the end of the power conduction means 32. By being pushed in, the counter contact plates 322 acquire contact over a large area with the contact plates 322', so that a low-impedance electrical connection suitable for high currents is obtained. For securing purposes, a tension bracket 324 is expediently provided which presses the contact plates 322, 322' against one another. FIG. 6b illustrates at the top a state shortly before mounting by pushing in and at the bottom a mounted state with the tension bracket 324.

Preferably, a plurality of supply modules with different lengths are available, which are designated in FIG. 7 as supply modules 3, 4 and 5. The length of the supply modules 3 and 4 should be in each case an integral multiple of a module A which in turn is an integral multiple of a basic module a. The basic module a is in this case determined by the rung spacing of the ladder 34. Since the length of the supply modules 3, 4 is in each case an integral multiple of the module A which is in turn an integral multiple of the basic module a, this ensures that the length of the supply modules is an integral multiple of the rung spacings. The supply modules can consequently be lined up with one another in any desired way, without uneven rung spacings occurring at the transition points.

So that as large a number of different tower heights as possible can be set up with as a small number of different supply modules as possible, the lengths of the individual supply modules 3, 4, 5 are preferably in a specific ratio to one another. It has proved especially appropriate if the first supply module 3 has a length which is an integral multiple of the module A, for example double this. The second supply module 4 has in turn a length which preferably corresponds to an odd-numbered multiple of the module A, for example to five times the length of the module A. The third supply module 5, however, has a length which is an integral multiple of the basic module a (rung module) 344, but is not an integral multiple of the module A, and the length of which is greater than the length of the first supply module 3. One example of this would be the length of the first supply module A plus six times the length of the basic module a (rung module) 344, hence 2A+6a. A multiplicity of overall lengths can thus be produced with a minimum of different supply modules 3, 4, 5. For example, let the rung module a be 25 cm and the module A 4 m, so that module lengths of 8 m, 9.5 m and 20 m are obtained. By means of these supply modules having only three different lengths, all tower heights even from 81 m can be covered by a step width of only 0.5 m.

In a preferred embodiment, the supply module according to the invention could be used in the lower part of a hybrid tower 10' which is composed, for example, in the upper part of a steel tube tower and in the lower part of a concrete tower. The system components in the steel tube tower could be preassembled either at the works or on the building site before the tower 10' is set up or else, after the setting up of the complete steel tube tower or individual steel tube tower segments, could be installed in these by means of the supply module according to the invention. The supply modules could be installed in the concrete part of the hybrid tower 10' as soon as a corresponding number of concrete segments are placed one on the other and these are sufficiently stabilized. It would also be possible, however, to construct the concrete tower to an extent such that a plurality of supply modules can be installed in succession. In a preferred procedure for setting up a hybrid tower, first the concrete tower would be equipped with the supply modules according to the invention before the steel tube tower, together with the preassembled system components, is set up on the concrete tower.

If tensioning elements for the vertical and/or horizontal bracing of the individual concrete segments are provided in the concrete tower, the supply modules would preferably be installed on the tower wall in a region, the immediate vicinity of which is not penetrated by tensioning elements.

The invention claimed is:
1. A wind power plant tower comprising:
multiple tower segments arranged one above the other and surrounding a tower inner space, and
a supply module comprising at least two system components selected from the group consisting of a conductor, a lighting and a climbing device for operating personnel, wherein
the at least two system components of the supply module are connected to each other on a girder,
the supply module is fastened at its upper and lower ends to an inner wall of the tower in the tower inner space, a length between the upper and the lower ends of the supply module spans a plurality of the tower segments, and at least two supply modules are connected to each other.

2. The wind power plant tower as claimed in claim 1, wherein the at least two system components comprises the conductor, and wherein the conductor comprises a power conductor or a signal conductor.

3. The wind power plant tower as claimed in claim 1, wherein the supply module is pre-assembled.

4. The wind power plant tower as claimed in claim 1, wherein the girder is removable from the supply module, when the supply module is fastened to the inner wall of the tower in the tower inner space.

5. The wind power plant as claimed in claim 1, comprising holder adapters for mounting the supply module in the tower inner space.

6. The wind power plant tower as claimed in claim 5 comprising a plurality of different holder adapters which each set a different spacing of the supply module from the inner wall of the tower.

7. The wind power plant tower as claimed in claim 5, wherein the holder adapters comprise a fixed bearing and a loose bearing.

8. The wind power plant tower as claimed in claim 7, wherein the fixed bearing and the loose bearing are configured to be integral with the supply module.

9. The wind power plant tower as claimed in claim 1, wherein the supply module is dimensioned such that it has a length which is substantially greater than the height of a tower segment.

10. The wind power plant tower as claimed in claim 1, wherein the supply module comprises at its ends in-line connection couplings by which the supply module is connected directly to another supply module.

11. The wind power plant tower as claimed in claim 1, wherein the tower segments comprise concrete material.

12. The wind power plant tower as claimed in claim 1, wherein at least one of the tower segments has a diameter of over five meters with a height of at least three meters.

13. The wind power plant tower as claimed in claim 1, wherein:
the at least two system components comprise the climbing device,
the climbing device is configured as a ladder that comprises a plurality of rung modules, and
a length of a first supply module of the at least two supply modules is an integral multiple of the rung module.

14. The wind power plant tower as claimed in claim 13, wherein a length of a second supply module is an integral multiple of the length of the first supply module, the length of the first supply module being an integral multiple of the rung module.

15. The wind power plant tower as claimed in claim 14, comprising a compensating supply module, the length of which is an integral multiple of the rung module but is not an integral multiple of the length of the first supply module.

16. The wind power plant as claimed in claim 1, wherein the tower is configured as a hybrid tower which is arranged in the lower region of a concrete tower and in the upper region of a steel tube tower.

17. The wind power plant tower as claimed in claim 16, wherein only the concrete tower is equipped with supply modules.

18. The wind power plant tower as claimed in claim 1, wherein the supply module is dimensioned such that it has a length which is greater than the height of at least three tower segments.

19. The wind power plant tower as claimed in claim 1, wherein the supply module is dimensioned such that it has a length which is no greater than the height of ten tower segments.

20. A method for setting up a wind power plant tower comprising multiple tower segments arranged one above the other and surrounding a tower inner space, and a supply module comprising at least two system components selected from the group consisting of a conductor, a lighting and a climbing device for operating personnel, the method comprising
placing the tower segments one above the other on a foundation, and
introducing the supply module, on which the at least two system components are connected by a girder, into the inner space of the tower segments,
fastening the supply module at its upper and lower ends to an inner wall of the tower such that a length between the upper and lower ends spans a plurality of the tower segments,
connecting at least two supply modules to each other.

21. The method as claimed in claim 20, wherein the supply module is pre-assembled before the supply module is introduced into the inner space of the tower segments.

22. The method as claimed in claim 20, wherein the at least two system components comprises the conductor, and wherein the conductor comprises a power conductor or a signal conductor.

23. The method as claimed in claim 20, wherein the tower is configured as a hybrid tower which is arranged in the lower region of a concrete tower and in the upper region of a steel tube tower.

24. The method as claimed in claim 23, comprising equipping the concrete tower with supply modules before the steel tube tower is set up on the concrete tower.

* * * * *